United States Patent
Nakano

(10) Patent No.: US 8,834,770 B2
(45) Date of Patent: Sep. 16, 2014

(54) SOLE COMPONENT FOR AN ARTICLE OF FOOTWEAR AND METHOD FOR MAKING SAME

(71) Applicant: Wolverine World Wide, Inc., Rockford, MI (US)

(72) Inventor: Kiyotaka Nakano, Rockford, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 0 days.

(21) Appl. No.: 13/710,603

(22) Filed: Dec. 11, 2012

(65) Prior Publication Data

US 2013/0091638 A1    Apr. 18, 2013

Related U.S. Application Data

(62) Division of application No. 11/829,148, filed on Jul. 27, 2007.

(51) Int. Cl.
*B29D 35/00* (2010.01)
*B29D 35/12* (2010.01)
*A43B 13/14* (2006.01)

(52) U.S. Cl.
USPC ........... 264/295; 264/244; 264/318; 12/146 B

(58) Field of Classification Search
CPC . B29D 35/0018; B29D 35/122; A43B 13/141
USPC ................... 264/295, 244; 12/146 B
See application file for complete search history.

(56) References Cited

U.S. PATENT DOCUMENTS

| | | | |
|---|---|---|---|
| 2,239,206 A | * | 4/1941 | Tietig ................ 36/11.5 |
| 4,309,832 A | | 1/1982 | Hunt |
| 4,372,525 A | | 2/1983 | Uhlig |
| 4,535,554 A | | 8/1985 | De Obaldia B. |
| 4,562,651 A | | 1/1986 | Frederick et al. |
| 4,924,606 A | | 5/1990 | Montgomery et al. |
| 5,210,963 A | | 5/1993 | Harwood |
| 5,408,761 A | | 4/1995 | Gazzano |
| 5,461,800 A | | 10/1995 | Luthi et al. |
| 6,149,852 A | | 11/2000 | Romanato et al. |
| 6,189,239 B1 | | 2/2001 | Gasparovic et al. |
| 6,412,196 B1 | | 7/2002 | Gross |
| 6,634,121 B2 | | 10/2003 | Sordi |
| 7,290,356 B2 | | 11/2007 | Fuerst |
| 7,685,747 B1 | | 3/2010 | Gasparovic et al. |

(Continued)

*Primary Examiner* — Alison Hindenlang
(74) *Attorney, Agent, or Firm* — Warner Norcross & Judd LLP

(57) ABSTRACT

A sole component having a base, a toe cover and an integral line of articulation permitting the toe cover to be molded in an "open" position and moved into a "closed" position during assembly on the article of footwear. The line of articulation may include a line of reduced thickness extending laterally across the sole. The line of articulation may also include breaks defined in the sidewall of the sole in alignment with the line of reduced thickness. The present invention also provides a method of forming a sole component generally including the steps of providing a mold having bottom and top mold parts shaped to cooperatively define a mold cavity in the shape of a sole component having a toe cover joined to a base along a line of articulation, closing the mold parts, injecting a sole forming material into the cavity, removing the sole component and moving the toe cover about the line of articulation into a closed configuration for use.

23 Claims, 4 Drawing Sheets

(56) References Cited

U.S. PATENT DOCUMENTS

| | | |
|---|---|---|
| 7,762,012 B2 | 7/2010 | Fuerst |
| 7,814,686 B2 | 10/2010 | Becker et al. |
| 2005/0060914 A1 | 3/2005 | Fuerst |
| 2005/0086836 A1 | 4/2005 | Palmer et al. |
| 2005/0268492 A1* | 12/2005 | Fuerst ............................ 36/77 R |
| 2006/0048407 A1 | 3/2006 | Seamans |
| 2006/0225305 A1 | 10/2006 | Morgan et al. |
| 2006/0265908 A1 | 11/2006 | Palmer et al. |

* cited by examiner

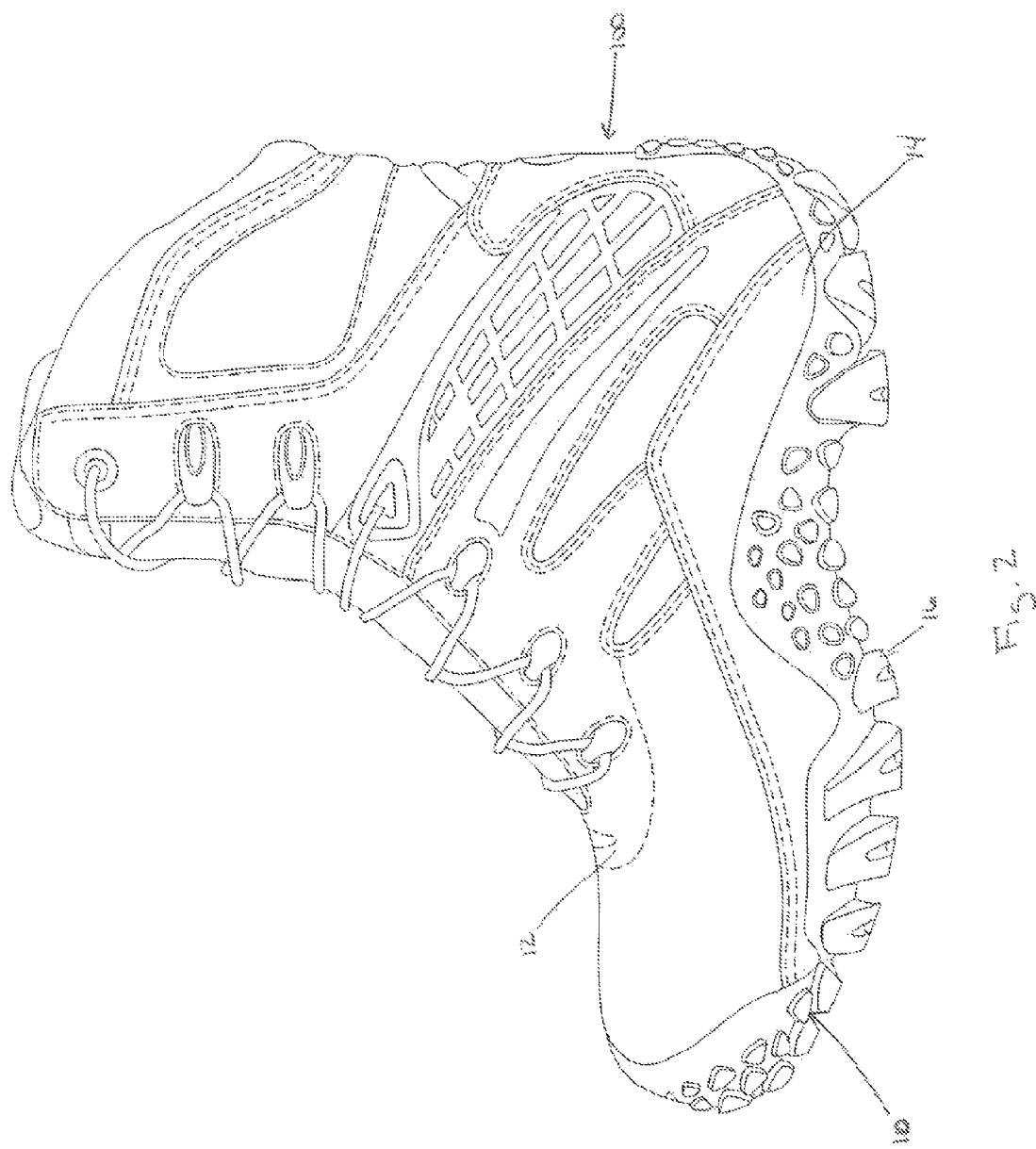

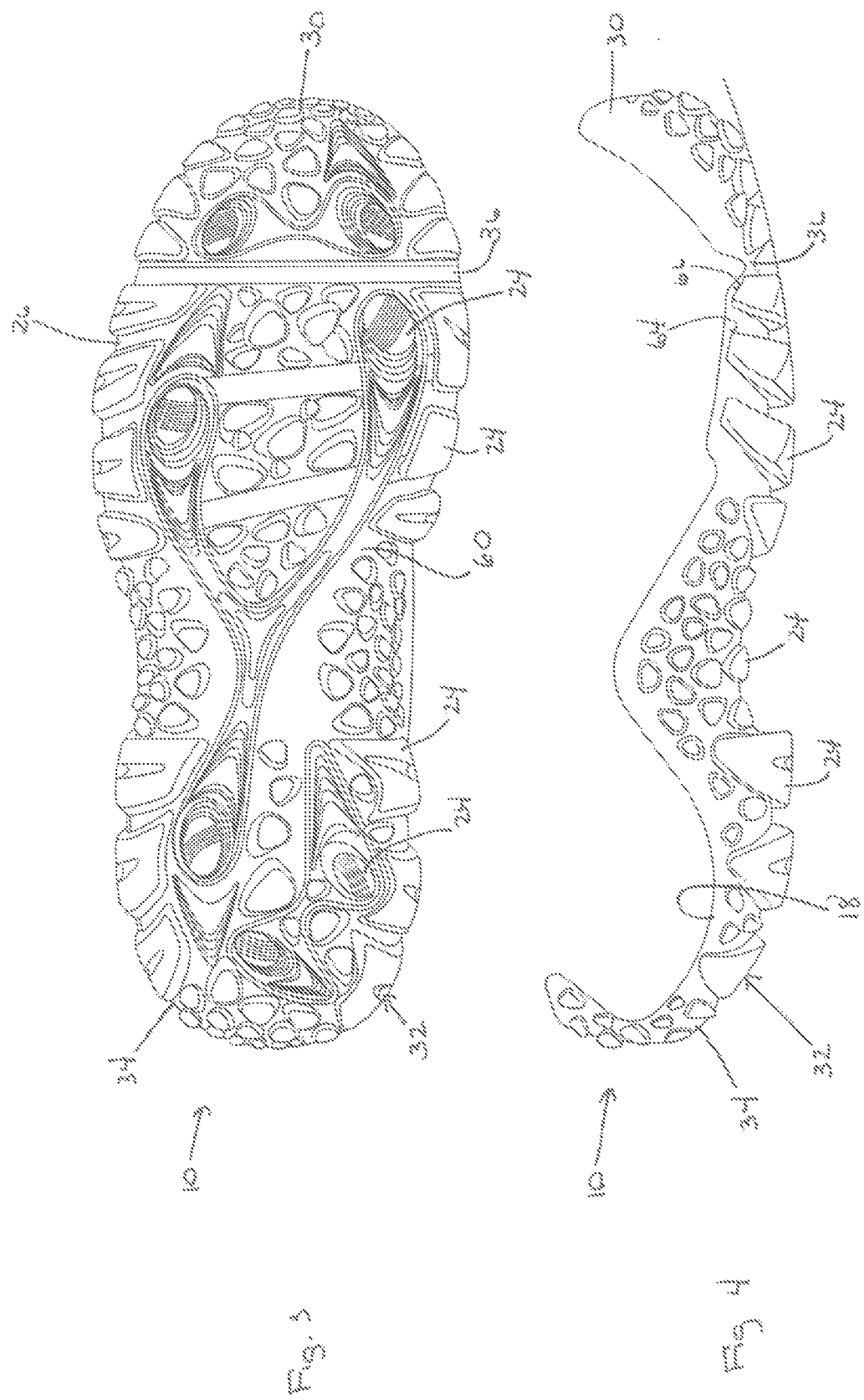

SOLE COMPONENT FOR AN ARTICLE OF FOOTWEAR AND METHOD FOR MAKING SAME

BACKGROUND OF THE INVENTION

The present invention relates to a sole component for an article of footwear and a method for making the sole component.

There is an ongoing effort in the footwear industry to produce footwear that provides durability and a high level of comfort, while maintaining a sense of style. As the styles change, so must the methods of manufacturing the shoes. However, such changes can and often do result in manufacturing difficulties.

Many of today's shoes include either a partial or complete toe cover, such that the toe of the shoe in encompassed at least partially by sole material. The primary difficulty with toe cover constructions is how the toe cover can be formed and attached via machinery. For example, in one construction the toe cover is formed as an integral part of the outsole. In this construction, the outsole extends the full length of the shoe and includes a heel cup at the rear of the shoe and a toe cover at the front of the shoe. Given the undercut nature of the toe cover, this sole cannot be manufactured using a conventional mold with a single moving mold part because the toe cover would entrap a portion of the mold preventing its removal from the mold.

A number of efforts have been made to improve on the conventional construction described above. In another conventional construction, a clog is provided with a molded midsole and an outsole attached to the midsole. In this construction, the toe cover is integrated into the midsole, rather than the outsole. The midsole is manufactured in a single molding step from lightweight elastomeric material, which is pliable, flexible and easily removed from the molding equipment. The outsole is made of multiple parts that are affixed to the midsole. The parts of the outsole may be formed of harder materials in the areas of greatest wear.

In yet another construction, both the sole and midsole are provided with toe covers. In this construction, the outsole is manufactured using a relatively complex multi-part mold. This permits the outsole to be removed from the mold in a direction substantially parallel to the plane of the outsole. The midsole is formed from multiple sections that are fitted into the outsole and affixed to one another. The use of multiple midsole sections may avoid the need for complex multi-part molding equipment for the midsole. Once assembled, the outsole hides the seam where the midsole sections are affixed to one another.

SUMMARY OF THE INVENTION

The present invention provides a sole component having a toe cover and a line of articulation that permits the outsole to be molded in an open configuration and moved into a closed configuration during assembly on the article of footwear. In one embodiment, the line of articulation is a line of reduced material thickness extending across the width of the sole. In one embodiment, the sole component includes a sidewall and the line of articulation includes at least one break defined in the sidewall. In one embodiment, the sole component is an outsole.

The present invention also provides a method of forming an articulating sole component with a toe cover. The method includes providing a mold having bottom and top mold parts for forming a sole with a toe cover in an open configuration. The bottom and top mold parts are closed to cooperatively define a cavity. The mold parts are contoured to define a mold cavity that will provide the molded sole component with a line of articulation adjacent the toe cover. The line of articulation permits the toe cover to be moved into a closed position after molding. A sole material is injected into the cavity for forming the sole component. Once sufficiently cured, the sole component is removed from the mold in the open configuration. During assembly to the article of footwear, the toe cover is pivoted into the closed position about the liner of articulation to provide the finished article of footwear with a closed toe cover. In one embodiment, the sole component is an outsole and the outsole is secured to the article of footwear by cement or other adhesives. In one embodiment, the article of footwear includes a removable footbed and the outsole with articulating toe cover is secured directly to the undersurface of the upper with the toe cover covering at least a portion of the toe region of the upper. In one embodiment, the sole includes a midsole secured to the undersurface of the upper and the articulating outsole is secured to the midsole with toe cover extending above the midsole covering at least a portion of the toe region of the upper.

The present invention provides a sole component with a toe cover that can be easily manufactured using a conventional mold with only a single moving mold part. The sole includes a line of articulation that permits the toe cover to be easily articulated between open and closed positions. The sole component of the present invention can be used with any footwear and enables a toe cover to be formed as a single unit with the outsole. The present invention also provides a method for manufacturing a sole component with a toe cover that can be implemented using a conventional mold with only a single moving part. The present invention provides an article of footwear that provides a desired aesthetic appeal while reducing the costs associated with the manufacture of conventional constructions of similar design.

These and other objects, advantages, and features of the invention will be readily understood and appreciated by reference to the detailed description of the current embodiment and the drawings.

BRIEF DESCRIPTION OF THE DRAWINGS

FIG. 2 is a side view of a boot incorporating the articulating sole of the present invention;

FIG. 3 bottom view of the articulating outsole of the present invention;

FIGS. 6A and 6B are side views of the molds of the present invention.

DESCRIPTION OF THE CURRENT EMBODIMENT

Figure 1:
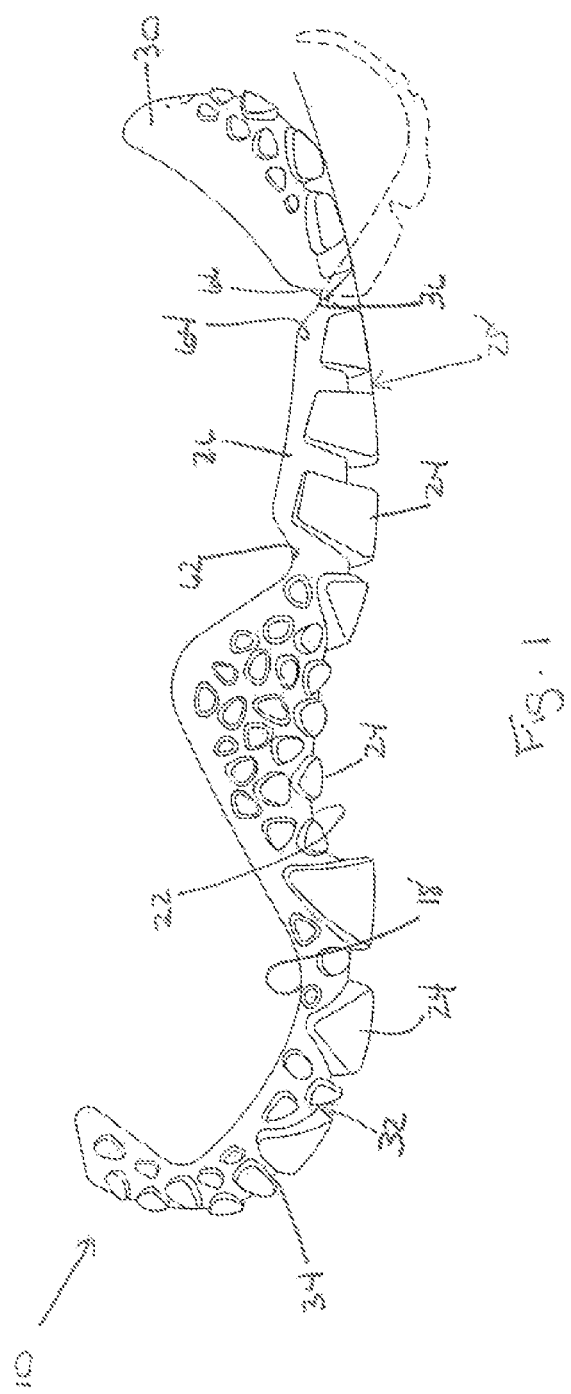
FIG. 1 is a side view of the articulating outsole of the present invention
Figure 4A:
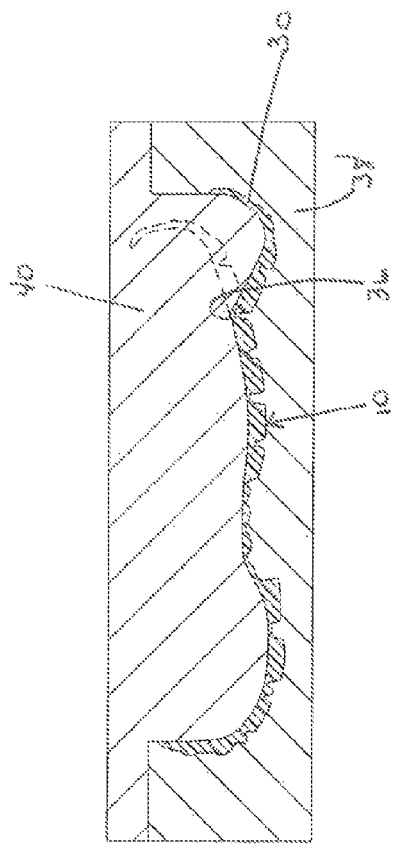
FIG. 4 is a medial view of the articulating outsole of the present invention.
Figure 4B:
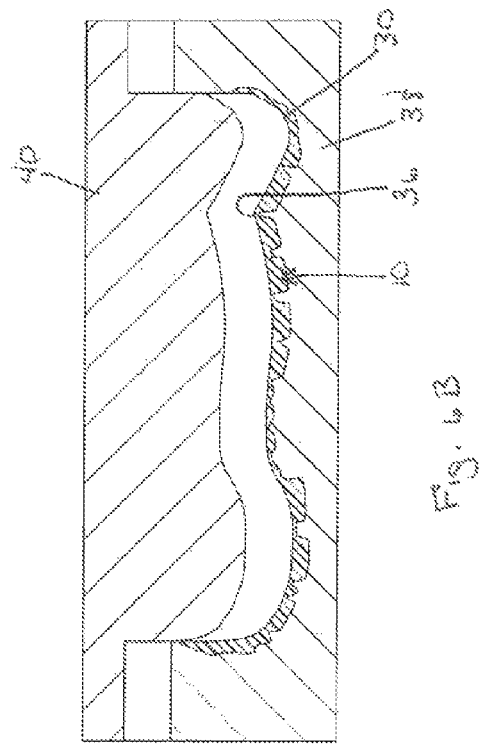

An article of footwear incorporating an outsole manufactured in accordance with an embodiment of the present invention is shown in FIG. 2. For purposes of disclosure, the present invention is described in connection with boot 100. The outsole of this embodiment is shown in FIG. 1 and generally designated 10. In the illustrated embodiment, the outsole 10 is incorporated into a boot 100 that includes an upper, an internal midsole 14 (or footbed), and an outsole 10. The outsole 10 is an articulating sole and is described in more detail below. The outsole 10 includes a toe cover 30 and a line of articulation 36 that permits the toe cover 30 to be molded in an open position (See FIG. 1B) and moved into a closed position (See FIG. 1A) after molding, for example, during assembly on the boot 100. The present invention is, however, well suited for us in other types of footwear, including other outdoor footwear, walking footwear, athletic footwear, multisport footwear, and work footwear. The invention is equally well suited for use in connection with other types of footwear including shoes, sandals, and other soled footwear. Accordingly, the terms "boot" and "shoe" are used interchangeably in this disclosure to refer to soled footwear in general.

As noted above, boot 100 includes an upper 12, an internal midsole 14 and an outsole 10. The upper 12 is manufactured from conventional materials (e.g. leather or other sufficiently durable material) according to conventional methods. For example, the upper 12 may utilize a conventional stroble construction. In the illustrated embodiment, the upper 12 is configured (e.g. sized and shaped) to accommodate an internal midsole 14 and, optionally, an internal insole (not shown) or sockliner (not shown). Alternatively, the upper 12 may be manufactured for use with an external midsole (i.e. a midsole disposed outside of and beneath the upper) (not shown). The outsole 10 is secured to the upper 12 using a cement or adhesive construction. Although described in connection with a cemented construction having an internal midsole, the present invention is well-suited for use in connection with essentially any footwear construction where a toe cover is desired. For example, the style of the upper 12, the sole configuration and the manner of securing the outsole 10 to the boot 100 may vary depending on the design of the article of footwear.

The outsole 10 is manufactured from essentially any material suitable for providing a durable and non-slip wear surface. The design and configuration of the outsole 10 will vary from application to application as desired. In the illustrated embodiment, the outsole 10 is a polymeric material selected from one of many well-known outsole materials having relatively high durometer, such as natural or synthetic rubber. The outsole 10 includes an upper surface 18 that is secured to the lower surface of the upper 12, for example, by cement or other adhesives. The outsole 10 also includes a lower surface 22 that is shaped to define the desired tread pattern. For example, the lower surface 22 can include a plurality of cleats 24 or other tread elements. In the illustrated embodiment, the outsole 10 is a cup-sole in the sense that it generally includes a base 60 and a sidewall 62. The base 60 of this embodiment generally forms the bottom of the outsole 10 being substantially coextensive with the bottom of the upper 12. The sidewall 62 extends upwardly around the periphery of the base 60 such that the base 60 and sidewall 62 cooperatively define a cup-shaped seat for the bottom of the upper 12.

The outsole 10 of the illustrated embodiment generally includes a forefoot portion 26 and a heel portion 34. The forefoot portion 26 extends through the forefoot region 28 of the outsole 10, providing a wear surface that engages the ground beneath the forefoot of the wearer's foot. In the illustrated embodiment, the bottom surface of the forefoot portion 26 is textured to provide improved traction. If desired, the forefoot portion 26 can include tread, lugs or other traction improving elements. The forefoot portion 26 is shaped to include a toe cover 30. The toe cover 30 extends from the forefoot portion 26 above and over the upper 12. In the illustrated embodiment, the toe cover 30 is an extension of the sidewall 62. The toe cover 30 provides additional structural support for the upper 12 as well as protecting the toe region of the boot 100 and the toes of the individual wearing the boot 100. In the illustrated embodiment, the heel portion 34 extends past the heel region 32 of the outsole 10, providing a wear surface that engages the ground beneath the heel of the wearer's foot and extends upward, covering a portion of the upper 12 located at the back of the boot 100. The bottom surface of the illustrated heel portion 34 is textured to provide improved traction. Like the forefoot portion 24, the heel portion 34 can include treads, lugs or other traction improving elements, as desired. In the illustrated embodiment, the forefoot portion 26 and heel portion 34 are molded as a single unit and secured by cement or other conventional adhesives.

The outsole 10 also includes a line of articulation or articulating joint 36 located in the forefoot portion 26. In the illustrated embodiment, the articulating joint 36 includes a line of reduced thickness 66 extending laterally across the base 60 of the outsole 10. The thickness of the material through the line of reduced thickness 66 may vary from application to application as desired to provide a highly flexible articulating joint 36. If desired, the cross-sectional shape of the material through the line of reduced thickness 66 may be selected to enhance flexibility. For example, the line of reduced thickness 66 may include an arched or bowed shape that easily bends through the desired range of motion of the toe cover 30. Additionally, the illustrated articulating joint 36 includes breaks 64 in the sidewall 62 that are substantially aligned with opposite ends of the line of reduced thickness 66. As shown, the breaks 64 in the illustrated outsole 10 can be integrated into the design of the sidewall 62 to provide an aesthetically pleasing appearance. The breaks 64 may, however, have essentially any alternative configuration that provides the line of articulation with the desired flexibility. For example, the breaks 64 may be thin cuts or slits through the sidewall 62. Cooperatively, the line of reduced thickness 66 and the breaks 64 in the sidewall 62 provide a living hinge that permits the toe cover 30 to pivot with respect to the remainder of the outsole 10. The articulating joint 36 may have alternative configurations in different applications. For example, the articulating joint 36 made include a channel (continuous or discontinuous), hinge, groove, perforations or other similar pivotable device that can be formed as one with the outsole 10.

As noted above, the articulating joint 36 enables the outsole 10 to be formed as a single unit in the mold despite the presence of the toe cover 30. The joint or hinge 36, as shown in FIGS. 6A and 6B, allows the outsole 10 to be formed in an "open" configuration and easily moved into a "closed" position after molding. In other words, the articulating joint 36 permits the toe cover 30 to be formed in an orientation that does not create an undercut region in the mold. This allows the outsole 10 to be removed from the mold without the need for complex multi-part molds. Once the outsole 10 is removed from the mold, the articulating joint 36 permits the toe cover 30 to be pivoted into the appropriate "closed" configuration. For example, during assembly of the boot 100, the toe cover 30 can be pivoted upwardly and rearwardly over the upper 12 and secured thereto to provide a permanent cover over a portion of the toe.

Figure 5A:
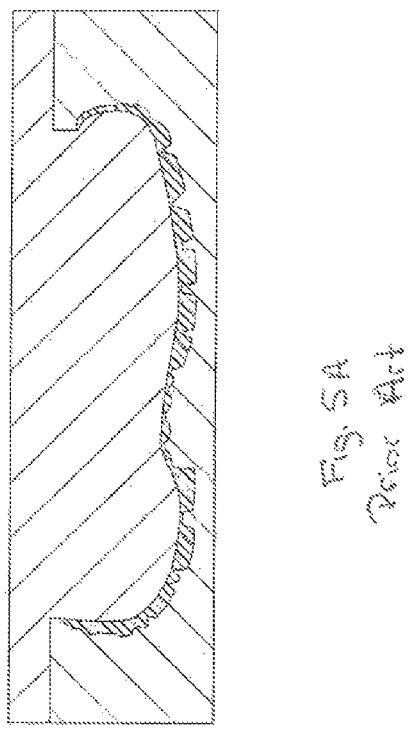
FIGS. 5A and 5B are side views of a side views of a standard molds, depicting the problems with forming an outsole having a toe cover incorporated therein.
Figure 5B:
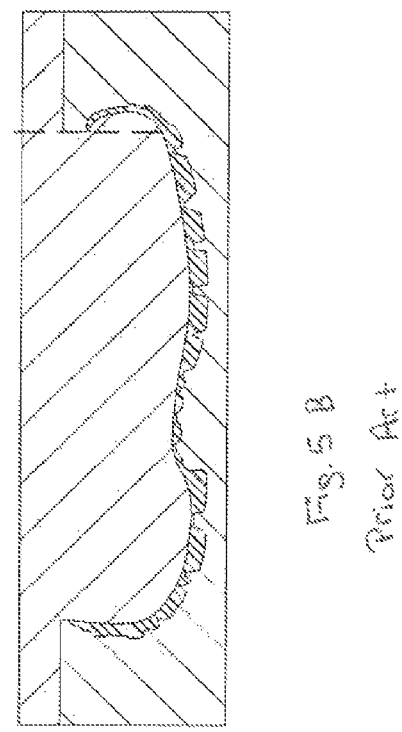

Manufacture of boot 100 will now be described with reference to FIGS. 5 and 6. The upper 12 is generally conventional and will not therefore be described in detail. Suffice it to say that upper is manufactured from conventional upper materials using conventional techniques and apparatus. In the illustrated embodiment, the bottom of the upper is closed, for example, by a stroble construction or any other suitable construction. The closed upper 12 may be secured to the outsole 10 using conventional adhesives.

The boot 100 includes a removable midsole 14 (or footbed) that functions to provide the desired cushioning. The midsole 14 is manufactured from an appropriate cushioning material, such as PU or EVA. The firmness of the midsole 14 may vary from application to application as desired. The midsole 14 may be manufactured using conventional techniques and apparatus. For example, the midsole 14 may be compression molded, pour molded, injection molded and die cut from a sheet stock. The midsole 14 may be manufactured using other techniques and apparatus corresponding to the selected insole material. The manufactured midsole 14 is removably fitted into the upper 12 to overlie the bottom of the upper 12 and provide a comfortable cushioning bed for the wearer's foot. Alternatively, the midsole 14 could be secured to the bottom of the upper using conventional cements or other adhesives.

In the illustrated embodiment, the outsole 10 may be manufactured using a generally conventional mold having a single linearly moving mold part. The molds used for manufacturing the illustrated outsole 10 are shown in FIGS. 6A and 6B. As shown, in the illustrated embodiment, the outsole 10 is injection molded using generally conventional injection molding machinery. The outsole 10 is molded from material having the desired resiliency and wear characteristics, such as a relatively high durometer polyurethane material. As shown in FIG. 6, the mold includes two parts, a bottom part 38 and a top part 40. The mold parts 38 and 40 are configured to cooperatively define a mold cavity 70 that forms the outsole 10 with the toe cover 30 in an "open" configuration. In other words, the outsole 10 is formed with the toe cover 30 in a rotated position that opens in the same as the motion of the mold parts so that the toe cover 30 does not create an undercut that is of sufficient depth to prevent operation of the molds. As a result, the outsole 10 produced via the mold can easily be released from the mold and can be formed using only the bottom part 38 and top part 40.

The outsole 10 is preferably attached to the midsole part 16 using conventional techniques and apparatus. In the illustrated embodiment, the outsole 10 is secured to the lower surface of the upper 12 by cement or other adhesives.

The sole construction may also include an insole (not shown) or sockliner (not shown) fitted into the upper 12 above the midsole 14. If included, the insole or sockliner may be manufactured using conventional techniques and apparatus. The insole or sockliner may be removably positioned over the midsole 14 or secured to the upper surface of the midsole 14, as desired.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method of forming a sole component for an article of footwear, comprising;
   providing a mold having bottom and top mold parts, the mold parts shaped to define a mold cavity in the form of a unitary sole component having a base, a toe cover in an open configuration, and an articulation joint adjacent the toe cover;
   closing the bottom and top mold parts to cooperatively define the cavity;
   injecting a sole forming material into the cavity to form the sole component;
   removing the formed sole component from the mold, wherein the toe cover is integrally joined to the base and is angled downwardly about the articulation joint in the open configuration, and wherein the articulation joint extends at least partially across the base; and
   moving the toe cover about the articulation joint into a closed configuration, wherein the toe cover would have created an undercut with respect to the mold parts had the sole component been molded with the toe cover in the closed configuration.

2. The method according to claim 1 further including joining the formed sole component to an upper.

3. The method according to claim 2 wherein the toe cover extends upwardly and rearwardly over the upper in the closed configuration.

4. The method according to claim 1 further including cooling the sole component prior to removal from the mold.

5. The method according to claim 1 wherein removing the formed sole component includes moving at least one of the top mold part and the bottom mold part to provide access to the sole component prior.

6. The method according to claim 5 wherein one of the top and bottom mold parts is a linearly moving mold part.

7. The method according to claim 5 wherein the sole component is further defined as one of a midsole and an outsole.

8. A method of manufacturing an article of footwear comprising:
   providing a mold having first and second mold parts;
   closing the first and second mold parts to cooperatively define a mold cavity having the exterior shape of a unitary sole component including:
   a base;
   a line of reduced thickness extending at least partially across the base, and
   a contoured toe cover integrally joined to the base and angled downwardly about the line of reduced thickness;
   injecting a sole forming material into the mold cavity to form a molded sole component;
   removing the molded sole component from the mold; and
   joining the molded sole component to an upper including a toe portion, wherein joining the molded sole component to the upper includes rotating the toe cover upwardly about the line of reduced thickness from an open configuration spaced apart from the upper to a closed position extending over and mating with the toe portion of the upper, wherein the toe cover would have created an undercut in the mold had the toe cover been molded in the closed configuration.

9. The method according to claim 8 wherein the toe cover extends upwardly and rearwardly from a forward portion of the molded sole component.

10. The method according to claim 8 wherein the molded sole component includes a base and a sidewall extending upwardly therefrom.

11. The method according to claim 10 wherein the line of reduced thickness extends at least partially across the base.

12. The method according to claim 10 wherein the sidewall includes a break that is substantially aligned with the line of reduced thickness.

13. The method according to claim 12 wherein the line of reduced thickness and the sidewall break cooperate to provide a living hinge that permits the toe cover to pivot upwardly with respect to the remainder of the sole component.

14. The method according to claim 8 wherein one of the upper and lower mold parts is a linearly moving mold part.

15. The method according to claim 8 wherein the sole component is further defined as an outsole.

16. The method according to claim 8 wherein the sole component is further defined as a midsole.

17. A method of manufacturing an article of footwear comprising:
   providing a mold having first and second mold parts;
   closing the first and second mold parts to cooperatively define a mold cavity having the exterior shape of a one-piece sole component including:
      a base,
      an articulation joint extending at least partially across the base, and
      a toe cover adjacent the articulation joint and angled downwardly relative to the base in an open configuration;
   injecting a sole forming material into the mold cavity to form a molded sole component;
   removing the molded sole component from the mold; and
   rotating the toe cover upwardly about the articulation joint from the open configuration to a closed configuration, wherein the toe cover would have created an undercut with respect to the mold parts had the sole component been molded with the toe cover in the closed configuration.

18. The method according to claim 17 further including joining the formed sole component to an upper.

19. The method according to claim 18 wherein the toe cover extends upwardly and rearwardly over the upper in the closed configuration.

20. The method according to claim 17 wherein the sole component is further defined as one of a midsole and an outsole.

21. The method according to claim 17 wherein the base includes a sidewall, and wherein the toe cover is molded with a three-dimensional shape including an extension of the sidewall.

22. The method according to claim 17 wherein the articulation joint includes a line of reduced thickness.

23. The method according to claim 17 wherein the base includes tread elements extending downwardly therefrom, and wherein the articulation joint is between adjacent ones of the tread elements.

* * * * *